US006883052B2

(12) United States Patent
Dorenbeck et al.

(10) Patent No.: US 6,883,052 B2
(45) Date of Patent: Apr. 19, 2005

(54) SYSTEM FOR SECURING DATA ON A DATA CARRIER

(75) Inventors: Claus Dorenbeck, Burgwedel (DE); Robert Joannes Van Essen, Amsterdam (NL)

(73) Assignee: Tele Atlas N.V., AK 'S-Hertogenbosch (NL)

( * ) Notice: Subject to any disclaimer, the term of this patent is extended or adjusted under 35 U.S.C. 154(b) by 325 days.

(21) Appl. No.: 10/182,906

(22) PCT Filed: Feb. 5, 2001

(86) PCT No.: PCT/NL01/00086

§ 371 (c)(1),
(2), (4) Date: Nov. 25, 2002

(87) PCT Pub. No.: WO01/57469

PCT Pub. Date: Aug. 9, 2001

(65) Prior Publication Data

US 2003/0162527 A1 Aug. 28, 2003

(30) Foreign Application Priority Data

Feb. 3, 2000 (NL) ............................................ 1014274

(51) Int. Cl.[7] .......................... G06F 12/14; G06F 13/00

(52) U.S. Cl. ........................ 710/200; 713/182; 713/200

(58) Field of Search .......................... 710/200; 713/182, 713/200; 705/55, 56, 57, 58, 59; 455/410, 411

(56) References Cited

U.S. PATENT DOCUMENTS

| | | | | |
|---|---|---|---|---|
| 4,411,017 A | * | 10/1983 | Talbot | 380/31 |
| 4,471,216 A | * | 9/1984 | Herve | 235/380 |
| 5,388,211 A | * | 2/1995 | Hornbuckle | 717/178 |
| 5,644,444 A | | 7/1997 | Braithwaite et al. | |
| 5,710,817 A | * | 1/1998 | Sjooquist | 713/159 |

(Continued)

FOREIGN PATENT DOCUMENTS

| | | |
|---|---|---|
| DE | 197 17 149 | 10/1998 |
| EP | 0 965 938 | 12/1999 |
| WO | WO 94 04972 | 3/1994 |
| WO | WO 99 21094 | 4/1999 |
| WO | WO 99 44114 | 9/1999 |
| WO | WO 99 56520 | 11/1999 |

OTHER PUBLICATIONS

Digital Rights Management—Wikipedia—Dec. 7, 2004.*

Overview of the Global System for Mobile Communications—John Scourias—Oct. 14, 1997.*

Secure Web Authentication with Mobile Phones—Min Wu, et al.*

SIM–based Subsrcriber Authentication for Wireless Local Area Networks—Yuh–Ren Tsai and Cheng–Ju Chang—IEEE—2003.*

Understanding Secure Audio Path—Microsoft—2001.*

*Primary Examiner*—Mark H. Rinehart
*Assistant Examiner*—Jeremy S. Cerullo
(74) *Attorney, Agent, or Firm*—Young & Thompson

(57) ABSTRACT

System for protecting data on a data carrier on which is stored an accessible medium code and data only accessible after presenting an access code, comprises: a) an apparatus incorporating, a programmed processor, a user interface, a mobile telephone incorporating a SIM-card, b) a central station incorporating a further programmed processor cooperating with a number of memories storing valid medium SIM and access codes. The processor can be connected through the telephone and a suitable communication network to the further processor in the central station whereby the SIM-code of the telephone and the medium code of the carrier are transferred to the further processor to be processed into an access code. The resulting combination of codes is compared with codes stored in memories, and in case of a valid code combination a coded access permission is sent to the processor enabling the software to read data from the data carrier.

8 Claims, 1 Drawing Sheet

U.S. PATENT DOCUMENTS

| | | | | | |
|---|---|---|---|---|---|
| 5,784,460 | A | | 7/1998 | Newman et al. | |
| 5,930,215 | A | * | 7/1999 | Fite et al. | 369/53.22 |
| 5,949,601 | A | * | 9/1999 | Braithwaite et al. | 360/60 |
| 6,002,929 | A | * | 12/1999 | Bishop et al. | 455/431 |
| 6,003,014 | A | * | 12/1999 | Lee et al. | 705/13 |
| 6,104,561 | A | * | 8/2000 | Braithwaite et al. | 360/60 |
| 6,119,020 | A | * | 9/2000 | Miller et al. | 455/558 |
| 6,178,506 | B1 | * | 1/2001 | Quick, Jr. | 713/168 |
| 6,198,823 | B1 | * | 3/2001 | Mills | 380/247 |
| 6,199,161 | B1 | * | 3/2001 | Ahvenainen | 713/155 |
| 6,230,002 | B1 | * | 5/2001 | Floden et al. | 455/411 |
| 6,321,079 | B1 | * | 11/2001 | Cooper | 455/411 |
| 6,338,140 | B1 | * | 1/2002 | Owens et al. | 713/168 |
| 6,526,512 | B1 | * | 2/2003 | Siefert et al. | 713/200 |
| 6,581,161 | B1 | * | 6/2003 | Byford | 713/182 |
| 6,587,947 | B1 | * | 7/2003 | O'Donnell et al. | 713/187 |
| 6,799,155 | B1 | * | 9/2004 | Lindemann et al. | 703/24 |
| 2001/0011352 | A1 | * | 8/2001 | O'Mahony | 713/200 |
| 2002/0002684 | A1 | * | 1/2002 | Fox et al. | 713/200 |

* cited by examiner

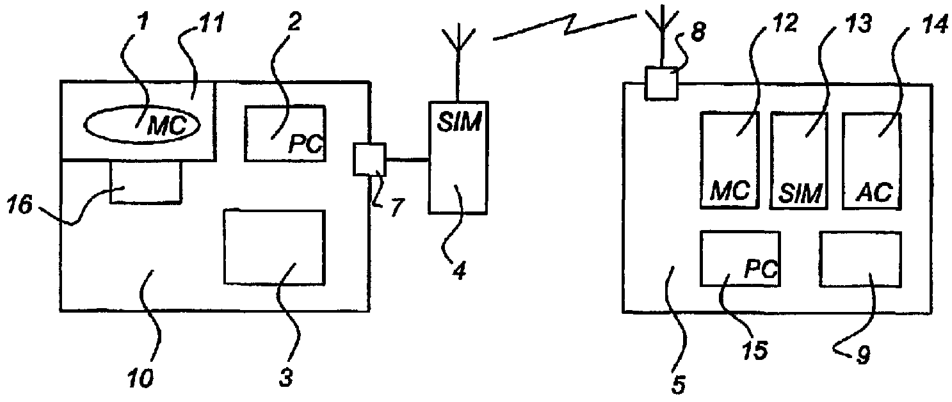
1
11
2
MC
PC
16
7
SIM
4
10
3
8
12
13
14
MC
SIM
AC
PC
5
15
9

SYSTEM FOR SECURING DATA ON A DATA CARRIER

The invention relates to a system for restricting access to data on a data carrier on which a medium code is stored in an accessible manner and on which data is stored which is only accessible after presenting a access code, which system comprises.

a) a user apparatus incorporating means for reading the data carrier,
 a suitably programed processor which during operation cooperates with the means for reading the data carrier
 a user interface which enables the processor to communicate with the user,
 communication means providing enabling communication over a communication network
b) a remote station incorporating a further suitably programmed processor cooperating with a memory in which a number of medium codes are stored, and
 communication means enabling communication over said communication network whereby initiated by the user the communication means of the user apparatus establishes a connection over said communication network to the communication means of the remote station, where after the medium code is transferred from the user apparatus to the remote station via said connection, in the remote station the received media code is compared to the at least one code stored in the memory and if the received code is equal to one of the stored codes then an access enabling signal is transferred back to the user station enabling the processor to obtain access to the data carrier.

The security level of this system is rather restricted. In case the CD ROM is stolen, then the thief only has to know the name of the original owner to easily gain access to the contents of the CD ROM.

The object of the invention is now to improve the security level of systems of this type. In agreement with this object the system according to the invention is now characterized in that the communication network is embodied as a mobile telephone network and the communication means are embodied as mobile telephone circuits incorporating the usual SIM code,
 that the memory of the remote station comprises a number of SIM codes and
 that together with the medium code the SIM code of the user apparatus mobile phone circuit are transferred to the remote station to be compared wit the stored SIM codes whereby the access enabling signal is only transferred if the received SIM code corresponds with one of the stored SIM codes.

If the combination is not found the central station will transmit a code through the telephone (and through the network) to the processor as a result of which the processor will, through the user interface, make it clear to the user that said user does not have access to the data on the data carrier and that for acquiring said access it is necessary to pay an also mentioned price. Furthermore the processor will ask the user by means of a thereto suited interaction with the processor) for instance by but not restricted to pressing a predetermined button confirm that he/she wants to pay or for instance but not restricted to by the pressing of another button refuses to pay. In case the user confirms his willingness to pay than the combination of medium code, SIM-code and access code will be stored in this central system for eventual later authentication and the user, which is identified by his SIM-code, will be debited for the agreed amount.

In such a system the user of the data carrier has to transmit the medium code to the central station together with the SIM-code of its mobile telephone. Before the data carrier can be read by the software both codes have to be transmitted through the mobile telephone to the central station to check if these codes are valid and if the combination is present in combination with a predetermined access code. Only if the combination is found and the access code is valid the access permission is returned. The access code is generated by the software in the central station on the basis of the trans-forward medium code and SIM-code. If the required combination of codes is not found initially no access will be granted and the user will be informed through a coded message which the central station transmits through the mobile telephone to the processor after which the processor will inform the user about this message through the user interface. Furthermore the user will be asked if he wants to obtain access by paying a mentioned price. The users response will be transmitted through the mobile telephone to the central system. In case the response is positive the code combination will be stored in the central system for eventual future authentication. In case the response is negative the central station will transmit a coded message through the mobile telephone to the processor for denying access after which the procedure is broken off.

In case a copy of the data carrier is made then, in case said copy is read in combination with another SIM-code, after authentication in the central system it will appear that said combination of codes is not present, after which the user is asked if he is willing to pay the required price. Use in combination with the same SIM-code in general indicates use by the same user, which is no problem, or points to a stolen SIM-code. Considering the security measures which are taken for that situation the chance thereon will be considered as sufficient small to accept the risk.

As already said the invention is specifically directed to data carriers on which large amounts of data can be stored. To avoid that various different versions of the data carriers have to be made, each with another collection of data files determined for a specific user group it is preferred to store all files on one carrier and to take measures such that a user is only able to access predetermined files.

In that respect a preferred embodiment of the system has the characteristic that the data carrier comprises a predetermined amount of data and that the software at any suitable moment during the start up procedure through a dialogue with the user and through the user interface determines to which sections of the data and during which periods the user will have access, which information is transferred in coded form back to the central station, where it is processed together with the medium code and the SIM-code into an access code which after said debiting procedure in combination with the medium code and SIM-code is stored in the central station and is transferred thereafter to the processor with the result that the software is only enabled to obtain access to selected data during selected periods. This explains also why in the first discussed embodiment there is a validity check on the access code.

The special access code signal determines therefore which sections of the data can be read.

If a complete legal system has already been used according the rules and nothing is changed to the configuration than it can be assumed that at the next start up of the system the legal data carrier is still present. In fact the exchange of codes is then superfluous. A system which takes that into account has according to the invention the further characteristic that it stores the during earlier operation received access situation in the processor and that the processor comprises or is connected to means for detecting removal of the data carrier, which means in case the data carrier is not removed since the last operation enable the software to obtain access to the data with the stored access situation.

The invention will be explained in more detail hereinafter with reference to a specific embodiment whereby it is remarked that the invention is not restricted thereto. Furthermore the attention will be drawn to the attached FIGURE.

Said FIGURE illustrates a simple embodiment of the system according to the invention. In the FIGURE schematically a system is shown comprising the data carrier 1 inserted into a data carrier reader 11, a processor 2, and a user interface 3. The components 1, 2, 3 and 11 are installed within an apparatus which is in general indicated by 10. Said apparatus has furthermore a communication port 7 providing a two-way connection to a mobile telephone 4. Finally the system comprises a central station 5 with a two-way communication module 8, a processor 9 and a number of memories such as 12 and 13, the function of which will be explained hereinafter. The processor 2 is functioning under control of suitable software to properly control the components 1, 2, 3, 7, and 11 and eventual further components and further electronic circuits which are not mentioned in detail because they are not important for understanding the invention.

The data carrier 1 can be embodied preferably as a CD-ROM or a DVD. However, the invention is certainly not restricted thereto but includes also hard discs, magnetic tape or surface memories, semiconductor memories and other type of memories or combinations of different types having preferably a large storage capacity. The data carrier stores not only a large amount of data but also a unique medium code MC by means of which the specific data carrier 1 can be distinguished from all other data carriers. This medium code MC is stored in a section of the data carrier which is always accessible for the carrier reader. The data is stored in sections which are only accessible using a permission code or stored in encrypted format whereby a decryption a key is needed.

As an example the apparatus 10 is destined to provide travel information to the driver of a vehicle for instance by indicating on a suitable display which road to drive to the destination and/or which petrol stations there are in the vicinity and/or which hotels there are in the next town or village. Systems of such a type are known and widely available on the market and do not need further explanation. Most of these systems make use of data carriers which store the necessary data which data has to be updated once and a while to keep track with changes in the road system, etc. For that purpose the user has to buy now and then an updated data carrier. As already indicated the central station 5 comprises a number of memories for storing series of code numbers, such as the memory 12 for storing medium codes and the memory 13 for storing SIM codes. In fact the memory 12 contains the medium codes of all data carriers which are legally produced and are brought on the market by authorised providers. The memory 13 comprises the SIM codes of all mobile telephones of all persons who have legally acquired the right to use a data carrier, for instance by buying the datacarrier from one of said abovementioned providers.

After installation of the apparatus but before actual use thereof the medium code MC of the datacarrier and the SIM code of the mobile telephone have to be transferred to the central station 5 to inform this station that the respective codes from now on are in use. Each mobile telephone 4 comprises in a suitable manner a SIM card or memory with a SIM-code. During initiation of the telephone 4 this SIM code is transferred to the central station 5 and compared with the codes stored in a SIM-memory 13. A label can be added for instance to the respective SIM code indicating that said code is in use.

The central station 5 preferably will comprise a further memory 14 for storing access codes AC which can be derived from a SIM code and an MC code by performing a specific algorithm in the processor 9. As soon as the SIM code and the related MC code are received for the first time in the central post 5 this algorithm is applied and the resulting access code AC is stored into the further memory 14.

During the start up of the whole system first of all the processor 2, after initiating the therein present software, will control the telephone 4 to establish contact with the central post 5. Thereby the SIM code is transferred automatically to the central post 5, wherein said SIM code is temporarily stored by the processor 9. The software in processor 2 is furthermore embodied such that the processor 2 will read the medium code MC from the carrier 1 and will transmit this code (eventually together with the SIM-code) to the central station 5. Both codes MC and SIM are processed by the processor 9 in the above-indicated manner into an access code AC. The now available combination of the three codes SIM, MC and AC is compared with the series of code combinations in the memories 12, 13 and 14. If the correct access code AC in combination with the specific SIM code and MC code is recognised an access code signal TC is transferred back from processor 9 to the processor 2 through communication module 8, mobile telephone 4 and communication module 7. The access code signal TC enables the software in the processor 2 to read (or decrypt) data from the data carrier and to use said data in the further circuits of the apparatus 10.

If no valid combination of codes SIM, MC and AC is found by processor 9 then a signal will be transmitted back through modules 7 and 8 and through the telephone 4 to the processor 2 on the basis of which the processor 2 informs the user through the user interface 3 that a certain price has to be paid to obtain access and asks if the user is prepared to pay said price. In case the user through a predetermined action, for instance by pressing a predetermined button in the user interface or in another manner, responds positively to said question than this positive response will be transferred back through module 7 and 8 and through the telephone 4 to the processor 9 in the central post 5. Therein the MC code is already recognised as valid, the user is identified by his SIM-code which SIM code is now stored and labelled as in use in memory 13 and the user will be debited on the basis thereof. Furthermore the combination of medium code, SIM-code and generated access code AC will be stored as valid. In case the whole procedure will be repeated at a later stage the transmitted combination of codes MC and SIM and the therefrom generated access code AC will now be recognised in the central station 5 as a valid combination so that an access signal TC can be returned.

In case a copy is made of the data carrier 1 than this copy will carry the same medium code MC. The person who wants to use this copy will however have a telephone 4 with another SIM-code. If now said person tries to activate the whole system than first of all his SIM-code will be transferred to the station 5 together with the medium code MC.

On the basis thereof the processor 9 will generate an access code which in combination with the two other codes is not recognised as valid combination. In the same way as explained above the user will be asked if he wants to pay for the data and if he/she responds positively a valid access code will be generated after which the debiting procedure will be activated as described above. So, for the use of an illegal copy the same price have to be paid as for a legal copy so that the problem of using illegal copies is disappeared.

In general the data carrier 1 will comprise a certain amount of data which does not have to be completely accessible for a certain user or does not have to be accessible at all times. In that case the system can be embodied such that, after it the apparatus 10 is activated, a dialog will be initiated between the central station 5 and the user during which dialog the user indicates which data during which period he likes to access. This information is transferred back the central station 5 which thereafter transmits a special access code signal TC' back to the apparatus 10 such that the software enables to the processor 2 to gain access only to the indicated data and during an indicated period.

A further code can be added to the system by incorporating a processor code in each processor in each apparatus 10. Therewith not only the data carrier and the telephone is checked as being a valid component in the system but also the apparatus 10 can be recognised as valid or unvalid. The processor code is transferred with the SIM code and the medium code MC to the central station 5 and stored in the processor 9. The PC code is compared with a series of processor codes stored in a suitable memory 15.

A further addition to the system could be a carrier presence detector. Such a detector can determine if the carrier has been temporarily removed from the reader since the carrier was last used in a legal manner. If the carrier is still present and if the same telephone or another telephone which is recognised as valid is used then in fact access can be granted without further checking.

What is claimed is:

1. System for restricting access to data on a data carrier on which a medium code is stored in an accessible manner and on which data is stored which is only accessible after presenting a access code, which system comprises:

a) a user apparatus incorporating means for reading the data carrier,
   a suitably programmed processor which during operation cooperates with the means for reading the data carrier
   a user interface which enables the processor to communicate with the user,
   communication means providing enabling communication over a communication network b) a remote station incorporating a further suitably programmed processor cooperating with a memory in which a number of medium codes are stored, and
   communication means enabling communication over said communication network, whereby initiated by the user the communication means of the user apparatus establishes a connection over said communication network to the communication means of the remote station, where after the medium code is transferred from the user apparatus to the remote station via said connection, in the remote station the received medium code is compared to the at least one code stored in the memory and if the received code is equal to one of the stored codes then an access enabling signal is transferred back to the user station enabling the processor to obtain access to the data carrier, characterized in that the communication network is embodied as a mobile telephone network and the communication means are embodied as mobile telephone circuits incorporating the usual SIM code, that the memory of the remote station comprises a number of SIM codes and that together with the medium code the SIM code of the user apparatus mobile phone circuit are transferred to the remote station to be compared with the stored SIM codes whereby the access enabling signal is only transferred if the received SIM code corresponds with one of the stored SIM codes.

2. System according to claim 1, characterized in that the processor comprises a processor code which preceding the first use is stored in a processor code memory in the remote station and that during start up of the operation also the processor code together with the SIM-code and the medium code is transmitted to the central station and compared with the therein stored processor code, whereafter in case of correspondence of all three codes an access code signal is sent to the processor enabling the software to read data from the data carrier.

3. System according to claim 2, characterized in that the data carrier comprises a number of data files and that the software at a suitable moment during the start up procedure through a dialog with the user determines to which files the user wants to have access, which information is transferred to the central station resulting in a special access code signal enabling the software to obtain access only to selected files.

4. System according to claim 3, characterized in that the access code signal which is received in the apparatus during first use is stored in the processor and that the processor comprises or is connected to means for detecting the removal of the data carrier, which means in case the data carrier is not removed since last operation, enables the software to obtain access to the data using the stored access code signal.

5. System according to claim 2, characterized in that the access code signal which is received in the apparatus during first use is stored in the processor and that the processor comprises or is connected to means for detecting the removal of the data carrier, which means in case the data carrier is not removed since last operation, enables the software to obtain access to the data using the stored access code signal.

6. System according to claim 1, characterized in that the data carrier comprises a number of data files and that the software at a suitable moment during the start up procedure through a dialog with the user determines to which files the user wants to have access, which information is transferred to the central station resulting in a special access code signal enabling the software to obtain access only to selected files.

7. System according to claim 6, characterized in that the access code signal which is received in the apparatus during first use is stored in the processor and that the processor comprises or is connected to means for detecting the removal of the data carrier, which means in case the data carrier is not removed since last operation, enables the software to obtain access to the data using the stored access code signal.

8. System according to claim 1, characterized in that the access code signal which is received in the apparatus during first use is stored in the processor and that the processor comprises or is connected to means for detecting the removal of the data carrier, which means in case the data carrier is not removed since last operation, enables the software to obtain access to the data using the stored access code signal.

* * * * *